US005936577A

United States Patent [19]

Shoki et al.

[11] Patent Number: 5,936,577

[45] Date of Patent: Aug. 10, 1999

[54] ADAPTIVE ANTENNA

[75] Inventors: Hiroki Shoki; Manabu Mukai, both of Kawasaki; Tokihiko Yokoi, Sagamihara, all of Japan

[73] Assignee: Kabushiki Kaisha Toshiba, Kawasaki, Japan

[21] Appl. No.: 08/953,666

[22] Filed: Oct. 17, 1997

[30] Foreign Application Priority Data

Oct. 18, 1996 [JP] Japan .................................. 8-276249

[51] Int. Cl.[6] ................................ H01Q 3/22; H04Q 7/00

[52] U.S. Cl. .......................... 342/373; 455/422; 370/339

[58] Field of Search ........................... 342/373; 455/422, 455/33.3; 379/59; 370/339

[56] References Cited

U.S. PATENT DOCUMENTS

| | | | |
|---|---|---|---|
| 5,548,813 | 8/1996 | Charas et al. . | |
| 5,596,329 | 1/1997 | Searle et al. | 342/374 |
| 5,734,345 | 3/1998 | Chen et al. | 342/74 |
| 5,754,139 | 5/1998 | Turcotte et al. | 342/373 |
| 5,815,116 | 9/1998 | Dunbridge et al. | 342/373 |

FOREIGN PATENT DOCUMENTS

| | | |
|---|---|---|
| 0 595 247 | 5/1994 | European Pat. Off. . |
| WO 94/09568 | 4/1994 | WIPO . |
| WO 95/09490 | 4/1995 | WIPO . |
| WO 96/29836 | 9/1996 | WIPO . |

OTHER PUBLICATIONS

Simon C. Swales, et al., "The Performance Enhancement of Multibeam Adaptive Base–Station Antennas For Cellular Land Mobile Radio Systems", IEEE Transactions on Vehicular Technology, vol. 39, No. 1, Feb. 1990, pp. 56–67.

Mitsuhiko Mizuno, et al., Electronics & Communications in Japan, vol. 77, No. 2, pp. 48–58, Feb. 02, 1994, "Application of Adaptive Array Antennas to Radio Communications".

*Primary Examiner*—Mark Hellner

*Attorney, Agent, or Firm*—Oblon, Spivak, McClelland, Maier & Neustadt, P.C.

[57] ABSTRACT

Features of an adaptive antenna are a controlling portion 11 as a method for detecting the communication amount of each beam and an antenna controlling portion 7 as a controlling method for controlling the pattern of each beam corresponding to information of the detected communication amount. In particular, an exciting weight of each antenna element is controlled corresponding to the detected communication amount and thereby the pattern of each beam is controlled. Thus, the communication amounts of individual beams can be flexibly well-balanced. Consequently, the communication capacity of the base station can be effectively used.

18 Claims, 9 Drawing Sheets

ADAPTIVE ANTENNA

BACKGROUND OF THE INVENTION

1. Field of the Invention

The present invention relates to an adaptive antenna for use with a base station for a mobile communication system, a local area radio communication system, and so forth.

2. Description of the Related Art

As an antenna for use with a base station for a mobile communication system, an antenna that form a plurality of sector beams is used. In the antenna, an area of 360 degrees on a horizontal plane of the base station is covered with a plurality of beams. As an example, six beams with a beam width of 60 degrees are disposed in the circumferential direction. As an antenna that forms sector beams, a dipole antenna with reflector is known. In this antenna, the beam width depends on the size of the reflector and the height of the dipole to the reflector.

However, such an antenna that form a plurality of beams does not have a means for controlling the difference of communication amounts of beams in the service area that the base station covers. For example, in an area of a particular sector beam, the communication amount is very large. In an area of another sector beam, the communication amount is very small. Such a situation often takes place. When the communication amounts are unbalanced among beams on the time base, such a problem can be solved by initially changing the beam widths of sector beams or initially changing the number of channels that are accommodated in the individual sectors. But in the case that unbalanced communication traffic may often change, it is difficult to overcome such a problem by using the conventional antenna.

SUMMARY OF THE INVENTION

An object of the present invention is to provide an adaptive antenna that allows patterns of a plurality of beams that cover a predetermined service area to be flexibly varied corresponding to communication environments.

Another object of the present invention is to provide an adaptive antenna that allows the communication amount to be well-balanced among beams and the communication capacity of the base station to be effectively used.

A further object of the present invention is to provide an adaptive antenna that allows the patterns of beams to be stably and optimally to be controlled so as to well-balance the communication amounts among beams.

To accomplish the above described objects, the present invention is an adaptive antenna, comprising a plurality of antenna elements for forming a plurality of beams that cover a predetermined service area, a detecting means for detecting the communication amount of data transmitted or received with each of the beams, and a controlling means for controlling a pattern of each of the beams corresponding to the detected communication amount.

In the adaptive antenna of the present invention, the controlling means has a beam pattern controlling means for controlling a pattern of each of the beams corresponding to the detected communication amount so as to cause the communication amounts of the beams to be nearly matched.

Thus, according to the present invention, patterns of a plurality of beams that cover a predetermined service area can be flexibly varied corresponding to variations of communication environments. Consequently, the communication amounts of beams can be prevented from deviating. As a result, the communication capacity of the base station can be effectively used. Thus, the number of terminals that can be accommodated can be increased. The adaptive antenna of the present invention has a plurality of first antenna elements and a plurality of second antenna elements, the first antenna elements composing a transmitting antenna portion, the second antenna elements comprising a receiving antenna portion and being analogous to the transmitting antenna portion, the ratio of the size of the transmitting antenna portion to the size of the receiving antenna portion being equal to the reciprocal of the ratio of a transmission frequency to a reception frequency. Thus, the shapes of the transmitting sector beams are always the same as the shapes of the receiving sector beams. Consequently, a communication defect due to the difference of shapes of sector beams can be prevented. Thus, good communication environments can be always maintained.

In the adaptive antenna of the present invention, the controlling means has a means for controlling a pattern of each of the beams when the maximum communication amount of each of the beams exceeds a predetermined value. Thus, according to the present invention, only when the communication amount of a particular beam becomes excessive, the patterns of individual beams are controlled so as to well-balance the communication amounts among the beams. Consequently, since an unnecessary controlling process is omitted, the adaptive antenna can be stably controlled.

In the adaptive antenna of the present invention, the beam pattern controlling means controls the beam widths of at least a first beam and a second beam, the first beam having the maximum communication amount, the second beam having the minimum communication amount. In this case, the beam pattern controlling means controls the beam widths of at least a first beam and a second beam, the first beam having the maximum communication amount, the second beam having the minimum communication amount while keeping the sum of the beam width of each beam nearly constant. Thus, even if the patterns of beams are varied, an area that is not covered can be prevented from taking place.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

Figure 1:
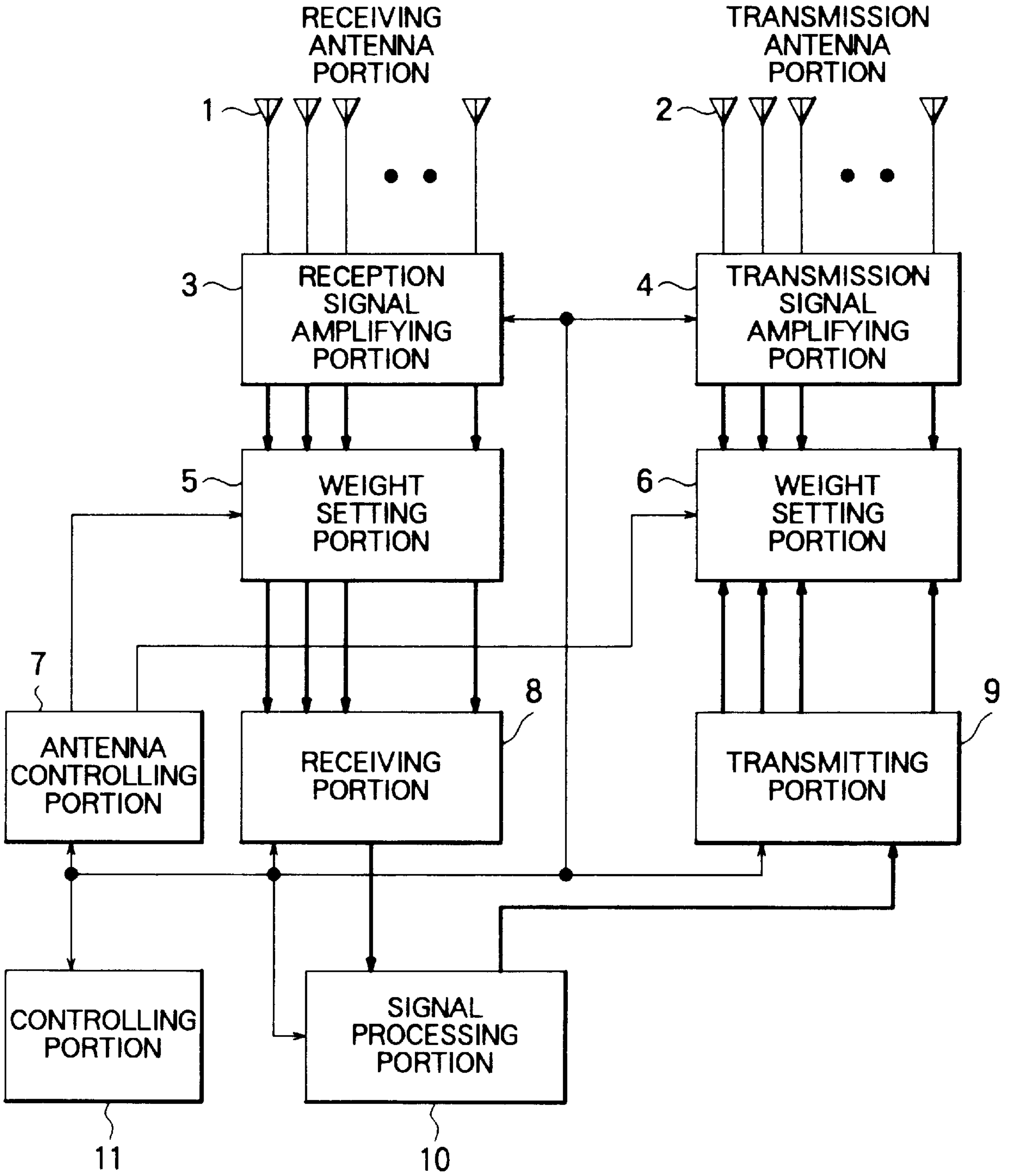
FIG. 1 is a block diagram showing the structure of an adaptive antenna according to an embodiment of the present invention.

FIG. 1 is a block diagram showing the structure of an adaptive antenna according to the embodiment of the present invention.

The adaptive antenna according to the embodiment of the present invention is an antenna for use with a base station. The adaptive antenna covers an area of 360 degrees on a horizontal plane of the base station with six sector beams.

Referring to FIG. 1, the adaptive antenna has a receiving antenna portion 1 and a transmitting antenna portion 2. The receiving antenna portion 1 and the transmitting antenna portion 2 each form six sector beams with a 12-element array. The sizes of the receiving antenna portion 1 and the transmitting antenna portion 2 and the intervals of the antenna elements depend on the frequency bands (or wave lengths) of radio waves that are received and transmitted. In reality, the receiving antenna portion 1 and the transmitting antenna portion 2 have different sizes and are analogous to each other. The shape parameter of the transmitting antenna portion 2 is equal to [reception frequency/transmission frequency] times the shape parameter of the receiving antenna portion 1. For example, assuming that the transmission frequency is 1 GHz and the reception frequency is 2 GHz, the size of the transmitting antenna portion is twice the size of the receiving antenna portion. Thus, the size of each antenna portion depends on the wave length of the radio wave for use. The intervals of the antenna elements are constant regardless of the wave length of the radio wave. In addition, with the same exciting weight, the beam pattern of the receiving antenna portion becomes the same as the beam pattern of the receiving antenna portion.

A signal received by an antenna element of the receiving antenna portion 1 is amplified by a reception signal amplifying portion 3. The amplified signal is weighted by a weight setting portion 5. The resultant signal is supplied to a receiving portion 8. A signal that is output from a transmitting portion 9 is distributed and then weighted by a weight setting portion 6. The weighted signal is amplified by a transmission signal amplifying portion 4. The amplified signal is sent to the transmitting antenna portion 2. The receiving portion 8 converts the received RF signal into a base band signal. The transmitting portion 9 converts a modulated base band signal into an RF signal. A signal processing portion 10 modulates/demodulates a base band signal. A controlling portion 11 controls signals to be sent to the outside and manages radio channels in association with the signal processing portion 10. The controlling portion 11 detects the communication amount for each sector. The communication amount can be obtained corresponding to for example the number of terminals that are communicating for each sector and the number of channels in operation.

An antenna controlling portion 7 determines an optimum exciting weight of each antenna element corresponding to information of the communication amount for each sector received from the controlling portion 11 and sends the obtained exciting weight to both a reception signal weight setting portion 5 and a transmission signal weight setting portion 6. At this point, the same exciting weight is set to the reception signal weight setting portion 5 and the transmission signal weight setting portion 6.

Figure 2:
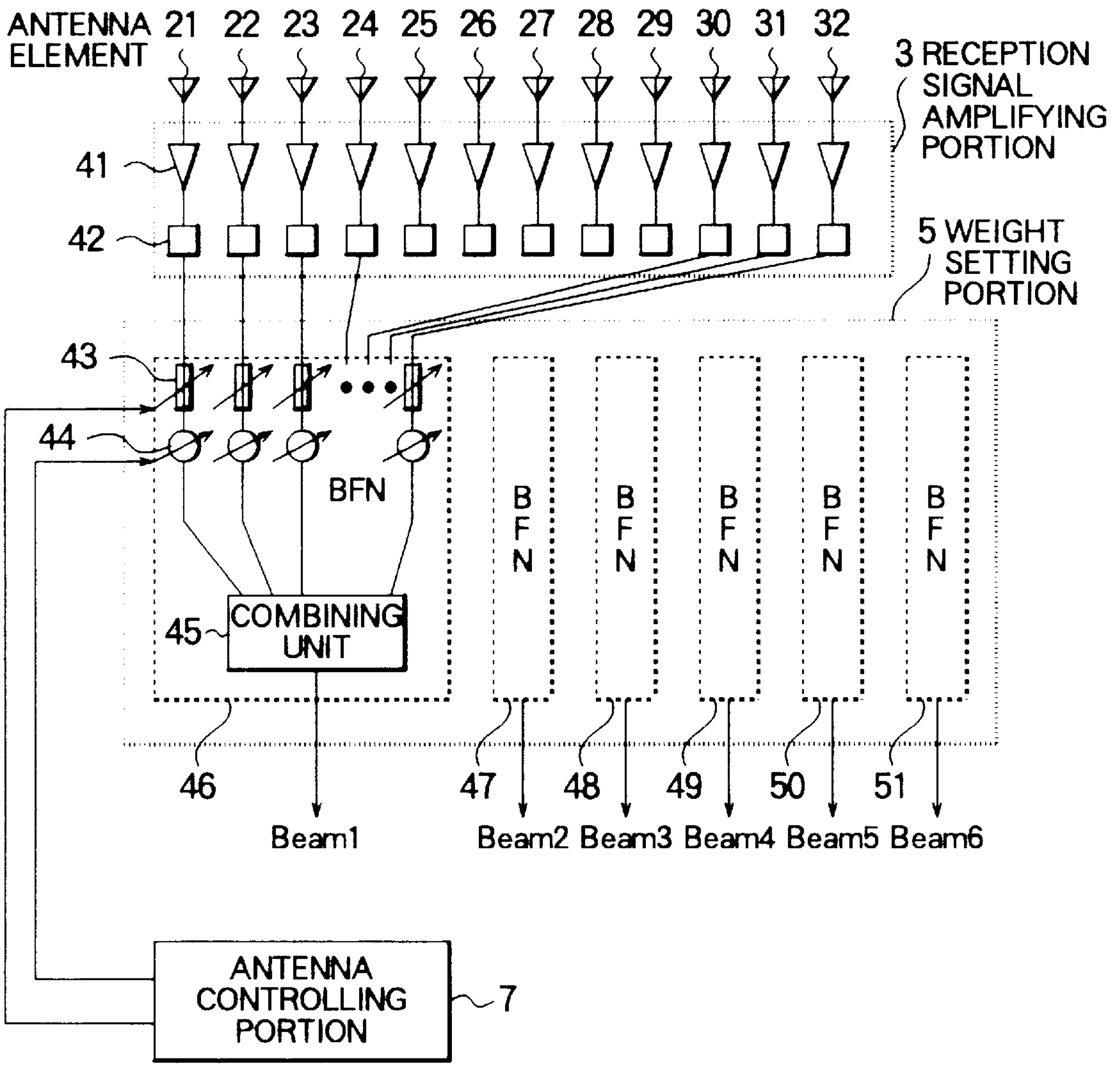
FIG. 2 is a schematic diagram showing the structure of a weight setting portion and an amplifying portion for a receiving antenna portion of the adaptive antenna shown in FIG. 1.

FIG. 2 is a schematic diagram showing the structure of the weight setting portion and the amplifying portion of the receiving antenna portion.

Referring to FIG. 2, six sector beams are formed with 12 antenna elements 21, 22, 23, 24, 25, 26, 27, 28, 29, 30, 31, and 23. A low noise amplifier (LNA) 41 and a distributing units 42 are connected to each of the antenna elements. The distribution number n of the distributing units 42 represents that one antenna element is used to form n sector beams. The reception signal amplifying portion 3 is composed of the low noise amplifier 41 and the distributing units 42. The weight setting portion 5 has beam forming circuits (BFN) 46, 47, 48, 49, 50, and 51 corresponding to respective sectors. Each BFN sets up exciting weights for seven (or eight) antenna elements. The weighted signals are combined for each sector by a combining unit 45. The combined signal is output to the receiving portion 8. Amplitude weights are set up by variable attenuators 43. Phase weights are set up by variable phase shifters 44.

As with the receiving antenna portion, the structure for controlling the exciting weights is also provided to the transmitting antenna portion. However, in the transmitting antenna portion, high power amplifiers (HPA) are used instead of the low noise amplifiers. The positions of the distributing unit and the combining unit of the receiving antenna portion are reversed in the transmitting antenna portion.

Figure 3:
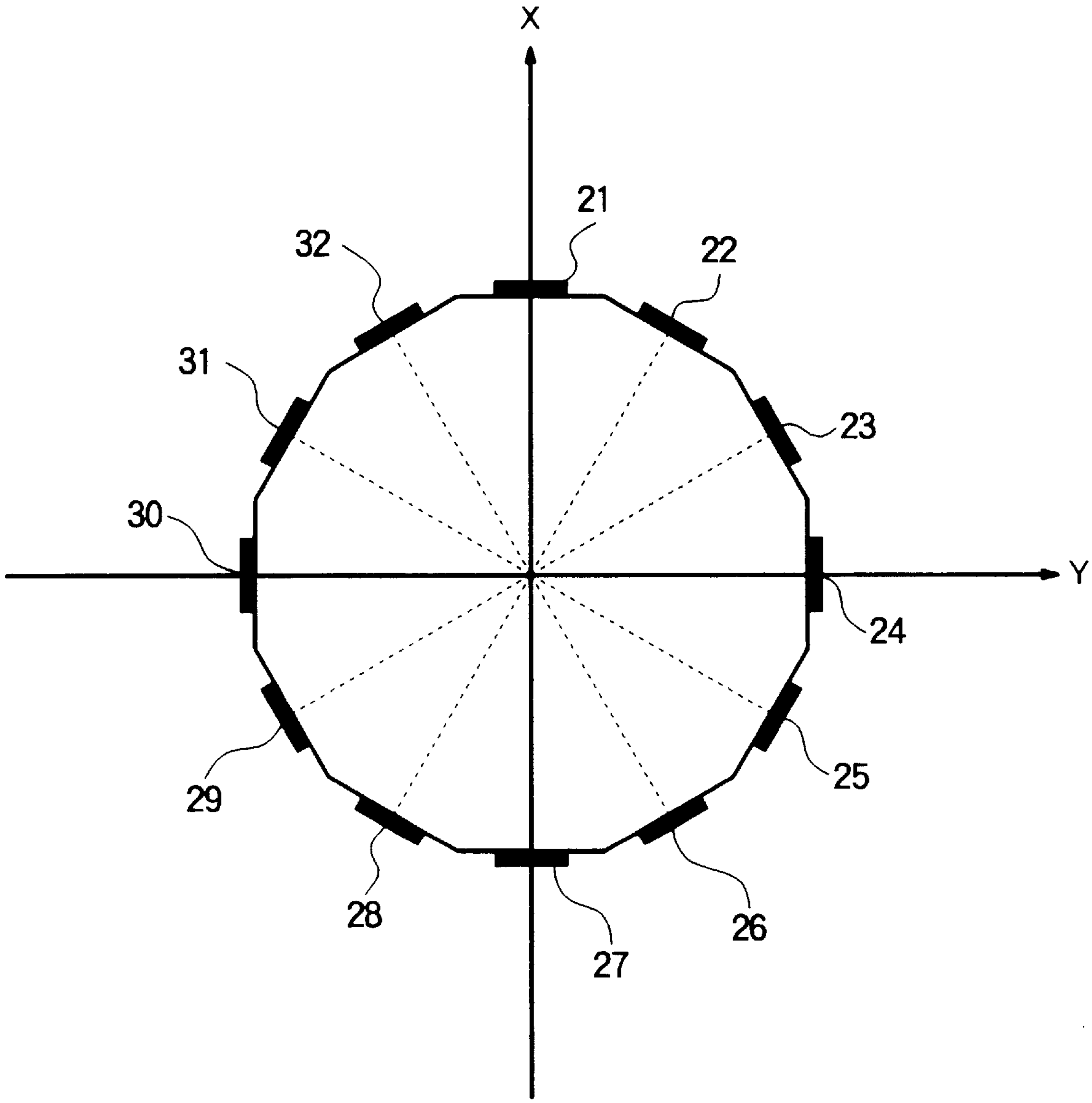
FIG. 3 is a top view showing the adaptive antenna according to the embodiment of the present invention.
Figure 4:
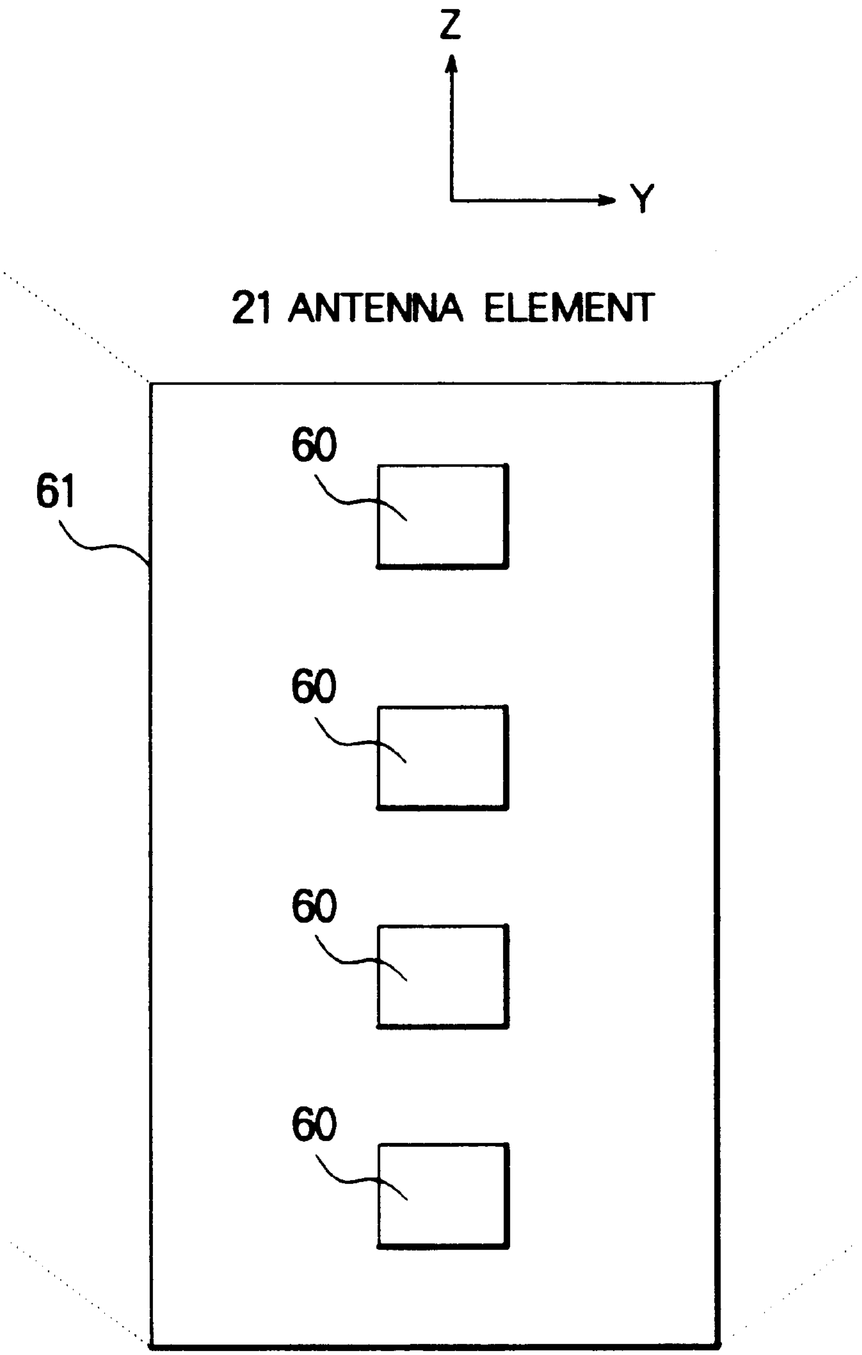
FIG. 4 is an external view showing the adaptive antenna shown in FIG. 3.

FIG. 3 is a top view showing the antenna. Referring to FIG. 3, 12 antenna elements are disposed at respective vertexes of a dodecagon. FIG. 4 is an external view showing an antenna element 21. Referring to FIG. 4, the antenna element 21 is composed of a plurality of planer antenna members 60 that are arranged in the vertical direction on a dielectric substrate 61. However, when it is not necessary to form a beam in the elevation direction, the antenna element may be composed of a single antenna member. It should be noted that a microstrip antenna or a dipole with a reflector can be used instead of the planer antenna members. In this example, as a feeding method, a series feeding method or a tournament feeding method using microstrip lines can be used.

The features of the adaptive antenna according to the present invention are the controlling portion 11 as a means for detecting the communication amount for each beam and the antenna controlling portion 7 as a controlling means for controlling each beam pattern corresponding to the information of the detected communication amount. In particular, since the exciting weight of each antenna element is controlled corresponding to the detected communication amount and thereby the pattern of each beam is controlled, the deviation of the communication amounts of beams can be flexibly compensated. Thus, the communication capacity of the base station can be effectively used. In addition, the number of terminals that can be accommodated to the base station can be increased. Consequently, the cost can be equivalently decreased.

Furthermore, the shape of the transmitting antenna portion is analogous to the shape of the receiving antenna portion. In addition, the ratio of the size of the transmitting antenna portion to the size of the receiving antenna portion is equal to the reciprocal of the ratio of the transmission frequency to the reception frequency. Thus, when the same exciting weight is set to the transmitting antenna portion and the receiving antenna portion, the shape of a sector beam of the transmitting antenna portion becomes the same as the shape of a sector beam of the receiving antenna portion. Thus, the shape of the transmitting sector beam becomes the same as the shape of the receiving sector beam. Thus, a communication defect due to the difference between a sector beam of the transmitting antenna portion and a sector beam of the receiving antenna portion can be prevented.

Figure 5:
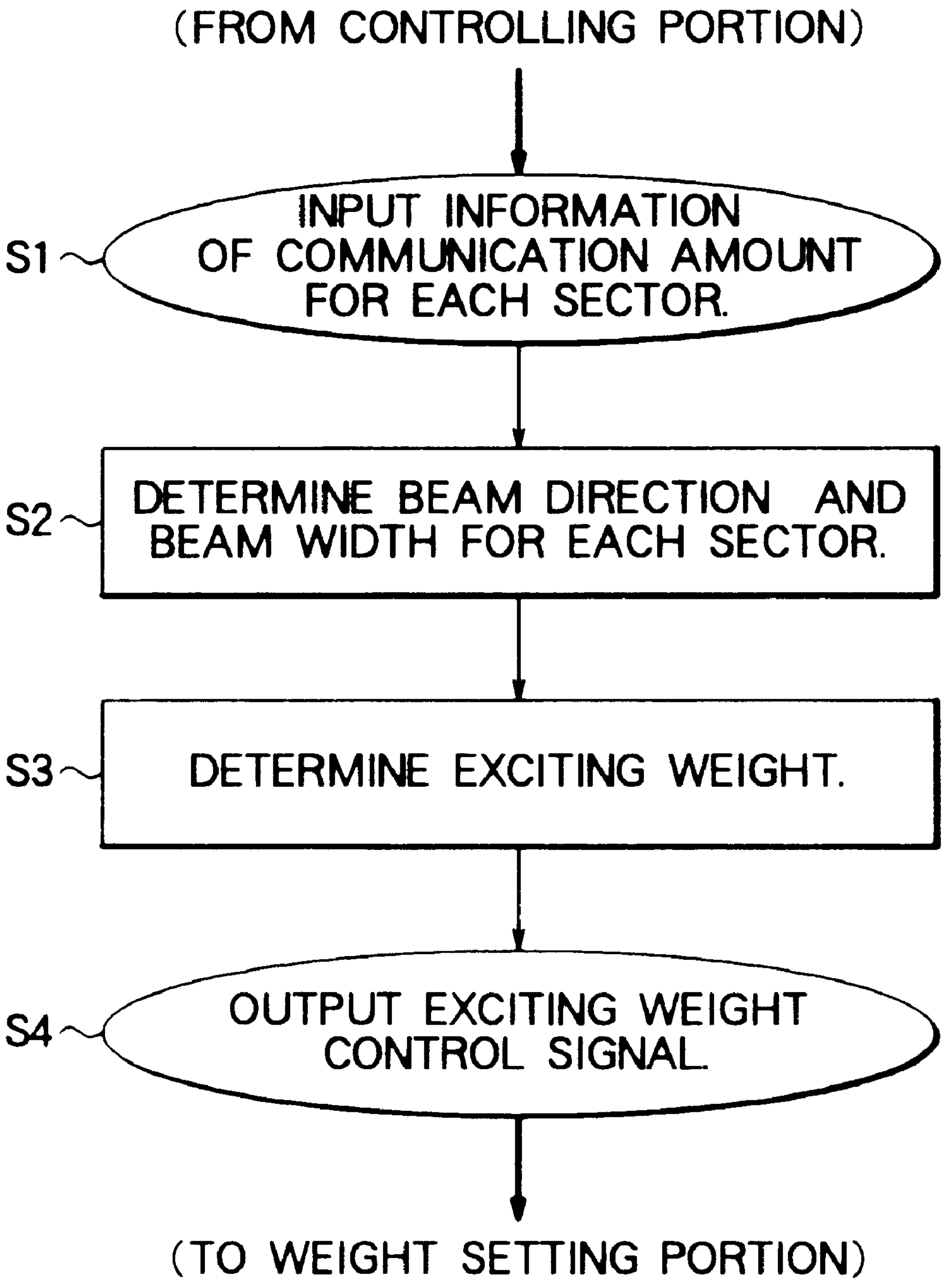
FIG. 5 is a flow chart showing a process of an antenna controlling portion of the adaptive antenna shown in FIG. 1.

FIG. 5 is a flow chart showing a process of the antenna controlling portion 7.

The antenna controlling portion 7 determines the beam direction and the beam width of each sector so that the communication amount of each beam is equalized corresponding to the information of the communication amount for each beam received from the controlling portion 11. The antenna controlling portion 7 obtains exciting weights for forming such beams and outputs the exciting weights to the weight setting portions 5 and 6.

Next, an example of the process of the antenna controlling portion 7 will be described.

It is assumed that the beam width of each sector beam is switched in five levels that are 30 degrees, 45 degrees, 60 degrees, 75 degrees, and 90 degrees. In addition, it is assumed that the beam width as the initial value (nominal value) is 60 degrees.

First of all, the antenna controlling portion 7 inputs information of the communication amount for each sector from the controlling portion 11 (at step S1). The antenna controlling portion 7 obtains the average of the communication amount per unit time for each sector and determines the most crowded sector and the most uncrowded sector.

Next, the antenna controlling portion 7 determines a desired pattern (beam direction and beam width) of each sector beam corresponding to the following rules (at step S2).

Rule 1: The beam width of a sector whose communication amount is the largest (most crowed) is narrowed by one level (for example, the beam width is switched from 60 degrees to 45 degrees).

Rule 2: The beam width of the sector whose communication amount is the smallest (most uncrowded) is widened by one level (for example, the beam width is switched from 60 degrees to 75 degrees).

Rule 3: While the beam widths of the other beams are fixed, only the beam direction of the relevant beams are adjusted.

Thereafter, the antenna controlling portion 7 obtains the antenna exciting weight for the desired pattern of each sector beam (at step S3). The antenna controlling portion 7 outputs a weight control signal for setting the obtained exciting weight to the weight setting portions 5 and 6 (at step S4).

As examples of obtaining an exciting weight, there are several methods. As a first method, an optimum pattern is selected from several patterns that have been prepared. As a second method, an exciting weight is converged by, for example, a method of steepest descent so that a mean square error with a desired pattern becomes minimum.

Step S2 to step S4 are repeated until the difference between the communication traffic amounts of sectors becomes a predetermined value or less or until the beam width of a particular sector of which communications concentrates cannot be narrowed.

Figure 6:
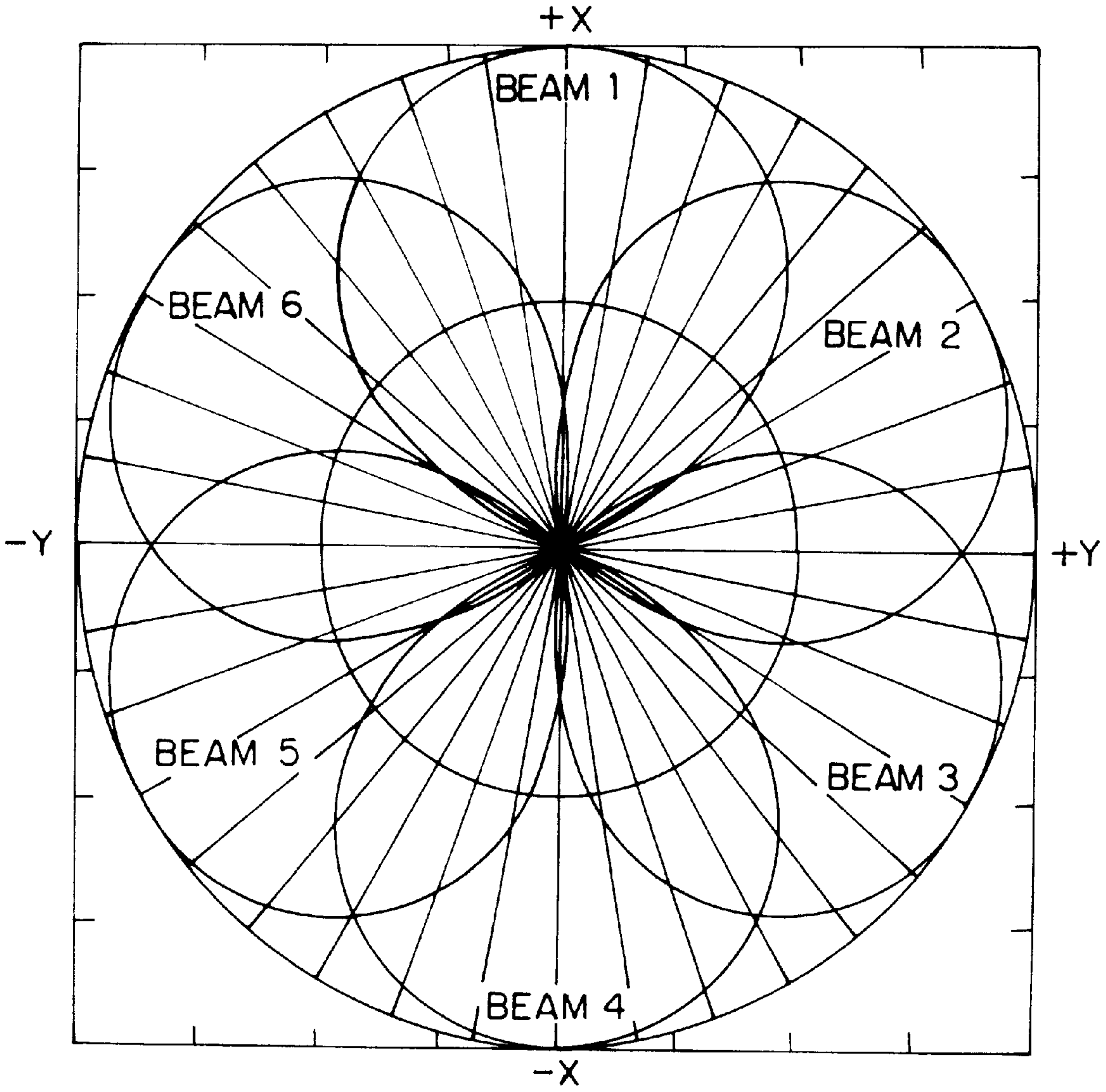
FIG. 6 is a schematic diagram showing beam patterns in the case that the beam widths of individual sector beams are 60 degrees in the adaptive antenna according to the embodiment of the present invention.
Figure 7:
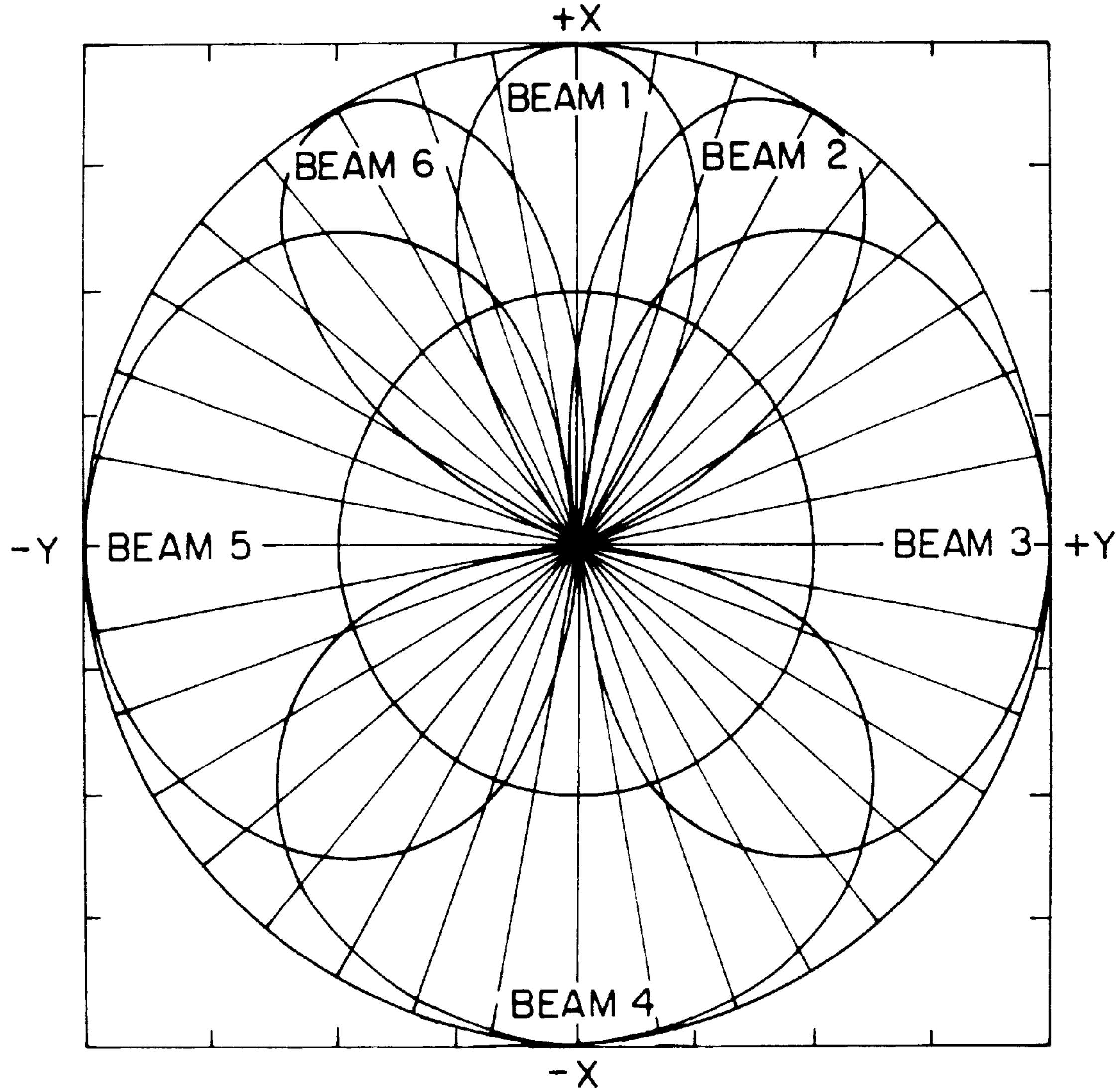
FIG. 7 is a schematic diagram showing a first example of which the beam patterns shown in FIG. 6 have been varied.

FIG. 6 shows an arrangement of patterns of sector beams in the case that the beam widths thereof are 60 degrees. When users concentrate in the +X direction and thereby the communication amount thereof increases, patterns are varied as shown in FIG. 7. The beam widths of sector beams (beams 1, 2, and 6) of which the communication amounts increase become narrow. On the other hand, the beam widths of sector beams (beams 3, 4, and 5) of which the communication amounts are relatively small become wide. In addition, the beam directions of individual sectors generally deviate in the +X direction. Such patterns are effective in the case that a place where people gather (for example, a station, an office district, an event hall, or the like) is present in a single direction viewed from the base station.

Figure 8:
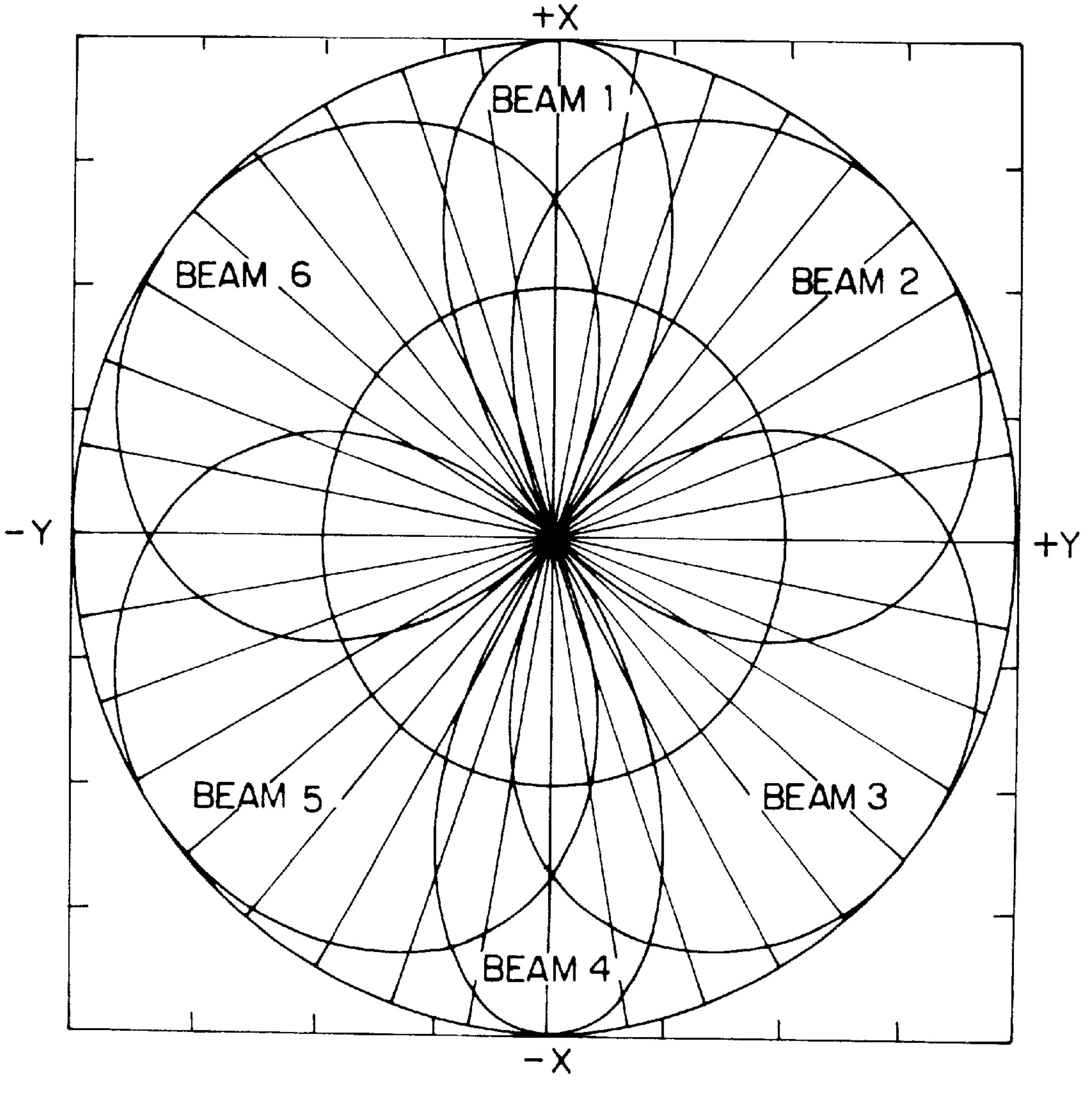
FIG. 8 is a schematic diagram showing a second example of which the beam patterns shown in FIG. 6 have been varied.
Figure 9:
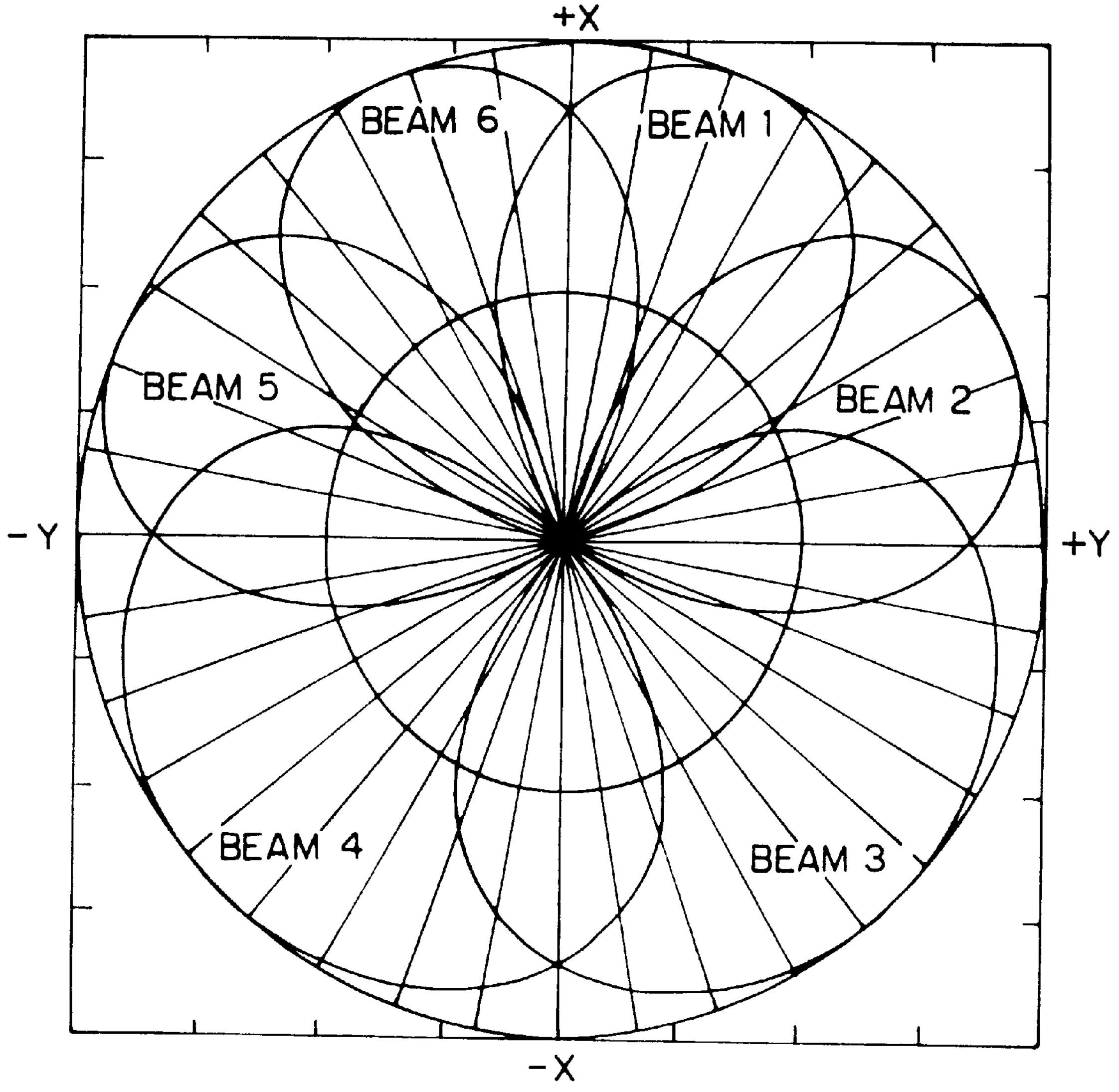
FIG. 9 is a schematic diagram showing a third example of which the beam patterns shown in FIG. 6 have been varied.

FIG. 8 shows an arrangement of patterns in the case that the users gather in both the +X direction and −X direction. The beam widths of the sectors in the +X direction and −X direction become narrow. In contrast, the beam widths of the other sectors become wide. Such patterns are effective in the case that the base station is disposed in the middle of a main road having heavy traffic. FIG. 9 shows patterns in the case that users gather in the direction of X>0. Such patterns are effective in the case that the base station is disposed near seashore or a mountain region and thereby the distribution of the users is geographically unstable.

As described above, with the adaptive antenna according to the present invention, the distribution of the users in the area that the base station covers can be compensated. With the adaptive antenna according to the present invention, the communication amounts of beams that are unbalanced due to the influences of geographical and traffic conditions can be compensated. In addition, the communication amounts of beams that are unbalanced due to temporal fluctuations can be compensated. When a sector beam of which communications are crowded is sharpened, the antenna gain of the area that the sector covers is increased. Thus, the transmission output power can be reduced for the increase of the gain.

Because of the above-described reasons, the adaptive antenna according to the present invention can very flexibly handle the variation of the communication state in the service area that the base station covers. Thus, it can be said that the adaptive antenna has very high use efficiency. For example, the adaptive antenna according to the present invention can equivalently increase the number of users (terminals) that can be accommodated several times as many as the conventional antenna has.

The present invention is not limited to the above-described embodiment. In other words, the present invention has other embodiments.

As another embodiment of the present invention, the patterns of individual beams are controlled in such a manner that the amount of the decrease of beam widths of the sector beams that are narrowed becomes equal to the amount of the increase of the beam widths of the sector beams that are widened. Thus, the total of the beam widths of all the beams is kept constant. The angular area covered with all sector beams can be more stably covered. Alternatively, the beam patterns may be controlled in such a manner that the amount of the decrease of the beam widths of sector beams that are narrowed becomes smaller than the amount of the increase of sector beams that are widened in as long as the difference of each value is smaller than a predetermined threshold value.

When beam patterns other than a beam with the largest communication amount and a beam with the smallest communication amount are controlled, it is preferably to fix the beam widths and vary only the beam directions. Thus, the beam patterns that cover one service area can be effectively maintained.

In addition, it is preferable to control the patterns of individual beams only when the communication amount of a beam with the largest communication amount exceeds a predetermined communication amount. Thus, the entire antenna can be simply controlled.

An adaptive antenna according to another embodiment of the present invention has a storing unit and an exciting weight information selecting means. The storing unit stores exciting weight information of each antenna element so as to accomplish the optimum pattern of each beam corresponding to the communication amount thereof. The exciting weight information selecting means selects relevant exciting weight information from the storing unit. With the adaptive antenna according to this embodiment, the optimum exciting weight can be set up by selecting relevant exciting weight information in the storing unit. Thus, the optimum exciting weight can be obtained more quickly than the system of which the beam width is switched in steps.

An adaptive antenna according to a further embodiment of the present invention has a storing unit and an exciting weight calculating means. The storing means stores information of optimum patterns corresponding to communication amounts of beams. The exiting weight calculating means calculates an exciting weight of which the difference between the pattern of each beam and a desired pattern becomes minimum. Thus, with the adaptive antenna according to this embodiment, the optimum exciting weights can be obtained more quickly than the system of which the beam widths are varied in steps. The stored information of the optimum patterns of beams corresponding to the communication amounts thereof can be freely varied corresponding to communication environments (communication amounts of individual beams that are unbalanced). Thus, the adaptive antenna can more flexibly handle various communication environments.

The calculated exciting weights may be varied in steps so as to obtain desired exciting weights. Thus, even if the patterns of sector beams are varied, a situation of which a communication of a user that is present in an angular area that the sector covers is disconnected is prevented as much as possible.

When a function for setting exciting weights of antenna elements and thereby placing a plurality of beams in the same shape is provided, a transmission load that concentrates in a particular area can be dispersed.

In addition, the number of sectors that have a prism shape and the number of antenna elements are not limited to those of the above-described embodiment. Moreover, exciting weights can be set up in a digital signal processing circuit that processes a digital signal on the base band.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. An adaptive antenna, comprising:

a plurality of antenna elements for forming a plurality of beams that cover a predetermined service area;

detecting means for detecting a communication amount of data transmitted or received with each of the beams; and controlling means for controlling a direction and width of each of the beams corresponding to the detected communication amount.

2. The adaptive antenna as set forth in claim 1, wherein said controlling means has beam pattern controlling means for controlling the direction and width of each of the beams corresponding to the detected communication amount so as to cause the communication amounts of the beams to be nearly matched.

3. The adaptive antenna as set forth in claim 1, wherein said controlling means has means for controlling the direction and width of each of the beams when a maximum communication amount of each of the beams exceeds a predetermined value.

4. The adaptive antenna as set forth in claim 2, wherein said beam pattern controlling means controls an exciting weight of each of the antenna elements so as to control the direction and width of each of the beam.

5. The adaptive antenna as set forth in claim 2, wherein said beam pattern controlling means controls the width of at least a first beam and a second beam, the first beam having a maximum communication amount, the second beam having a minimum communication amount.

6. The adaptive antenna as set forth in claim 2, wherein said beam pattern controlling means controls the width of at least a first beam and a second beam, the first beam having a maximum communication amount, the second beam having a minimum communication amount while keeping a sum of widths nearly constant.

7. The adaptive antenna as set forth in claim 4, wherein said beam pattern controlling means has:

a weight information storing unit for storing exciting weight information of each of the antenna elements so as to accomplish optimum control of each of the beams corresponding to the communication amount of each of the beams; and means for selecting relevant exciting weight information in said weight information storing unit.

8. The adaptive antenna as claimed in claim 4, wherein said beam pattern controlling means has:

a pattern information storing unit for storing optimum direction and width information for each of the beams corresponding to the communication amount of each of the beams; and means for calculating an exciting weight corresponding to a minimum difference between direction and width of each of the beams and the optimum direction and width information stored in said pattern information storing unit.

9. The adaptive antenna as set forth in claim 4, wherein said beam pattern controlling means switches an exciting weight of each of said antenna elements in steps so as to control the direction and width of each of the beams.

10. An adaptive antenna, comprising:

a plurality of antenna elements for forming a plurality of beams that cover a predetermined service area;

detecting means for detecting for each of the beams a communication amount of data transmitted or received with each of the beams; and controlling means for controlling a direction and width of each of the beams corresponding to the detected communication amount for each of the beams.

11. The adaptive antenna as set forth in claim 10, wherein said controlling means has beam pattern controlling means for controlling the direction of each of the beams corresponding to the detected communication amount so as to cause the communication amounts of the beams to be nearly matched.

12. The adaptive antenna as set forth in claim 10, wherein said controlling means has means for controlling the direction and width of each of the beams when a maximum communication amount of each of the beams exceeds a predetermined value.

13. The adaptive antenna as set forth in claim 11, wherein said beam pattern controlling means controls an exciting weight of each of the antenna elements so as to control the direction and width of each of the beam.

14. The adaptive antenna as set forth in claim 11, wherein said beam pattern controlling means controls the width of at least a first beam and a second beam, the first beam having a maximum communication amount, the second beam having a minimum communication amount.

15. The adaptive antenna as set forth in claim 11, wherein said beam pattern controlling means controls the width of at least a first beam and a second beam, the first beam having a maximum communication amount, the second beam having a minimum communication amount while keeping a sum of width nearly constant.

16. The adaptive antenna as set forth in claim 13, wherein said beam pattern controlling means has:

a weight information storing unit for storing exciting weight information of each of the antenna elements so as to accomplish optimum control of each of the beams corresponding to the communication amount of each of the beams; and means for selecting relevant exciting weight information in said weight information storing unit.

17. The adaptive antenna as claimed in claim 13, wherein said beam pattern controlling means has:

a pattern information storing unit for storing optimum direction and width information for each of the beams corresponding to the communication amount of each of the beams; and means for calculating an exciting weight corresponding to a minimum difference between direction and width of each of the beams and the optimum direction and width information stored in said pattern information storing unit.

18. The adaptive antenna as set forth in claim 13, wherein said beam pattern controlling means switches an exciting weight of each of said antenna elements in steps so as to control the direction and width of each of the beams.

* * * * *

UNITED STATES PATENT AND TRADEMARK OFFICE

CERTIFICATE OF CORRECTION

PATENT NO. : 5,936,577

DATED : AUGUST 10, 1999

INVENTOR(S): HIROKI SHOKI, ET AL.

It is certified that an error appears in the above-identified patent and that said Letters Patent is hereby corrected as shown below:

Column 4, line 36, change "planer" to --planar--

Column 8, line 66, after "direction" insert --and width--.

Column 9, line 24, change "width" to --widths--.

Signed and Sealed this

Tenth Day of April, 2001

*Attest:*

NICHOLAS P. GODICI

*Attesting Officer*

*Acting Director of the United States Patent and Trademark Office*